Aug. 3, 1937.  L. B. MEYERSON  2,088,658
NURSERY UTENSIL
Filed Aug. 25, 1936

INVENTOR.
Louis B. Meyerson
BY
Fay, Oberlin & Fay
ATTORNEYS.

Patented Aug. 3, 1937

2,088,658

UNITED STATES PATENT OFFICE 2,088,658

NURSERY UTENSIL

Louis B. Meyerson, Greenwich, Ohio

Application August 25, 1936, Serial No. 97,782

1 Claim. (Cl. 21—79)

This invention relates to a combined utensil for use in the nursery, serving the purposes of a bottle warmer, a bottle sterilizer, or a nipple sterilizer, and aiming to provide such a utensil which will be compact, simple and durable in construction and effective in operation for all functions. A single bottle sterilizer is frequently necessary because physicians often prescribe formula which must be prepared individually for each bottle at the time of feeding, which need is well filled by my present invention.

In the following description and accompanying illustration of a preferred embodiment the utensil is shown equipped for electrical heating, but it will be appreciated that the principles of the invention are equally applicable to other heating means.

To the accomplishment of the foregoing and related ends, said invention, then, consists of the means hereinafter fully described and particularly pointed out in the claim.

The annexed drawing and the following decription set forth in detail certain structure embodying the invention, such disclosed means constituting, however, but one of various structural forms in which the principle of the invention may be used.

Figure 1:
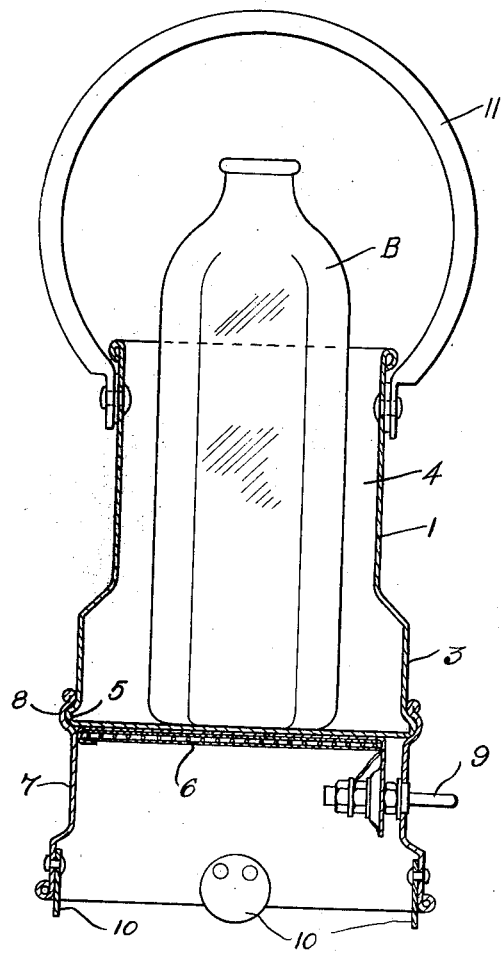
Figure 2:
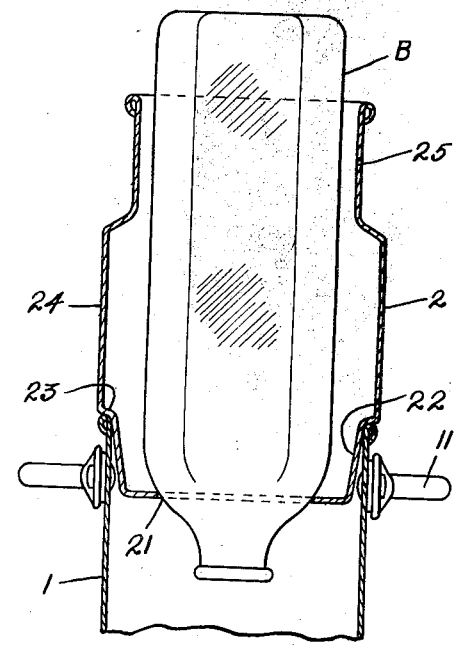
Figure 3:
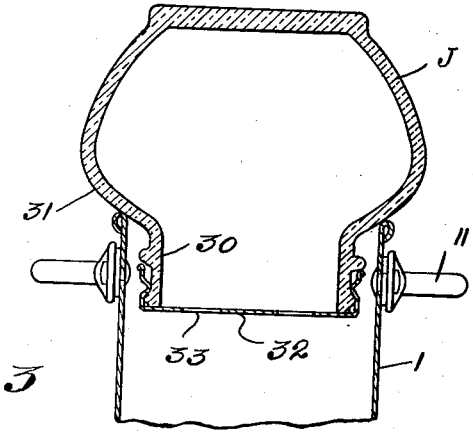

In said annexed drawing:

Fig. 1 is a vertical central section through the utensil when used as a heater, certain parts being shown in elevation;

Fig. 2, which is on the plane of Fig. 1, illustrates the employment as a bottle sterilizer; and Fig. 3, also on the same plane, illustrates the employment as a nipple sterilizer.

As best seen in Figs. 1 and 2, the utensil comprises a bottle holding section 1 and an extension 2 adapted to be fitted to the top thereof. The portion 1 is an upright vessel somewhat enlarged at the bottom as at 3, and necked above the bottom as at 4, preferably made of a single seamless piece of metal which may be slightly outwardly beaded as at 5 at the junction of the bottom with the sides. The neck portion 4 is a little larger than the size of an ordinary nursing bottle, such a bottle being indicated at B, and this neck portion is of a height preferably somewhat less than the shoulder height of the bottle, so that the bottle can be conveniently set in and taken out. The reduced neck 4 enables the user to surround the bottle with hot water almost up to the shoulder and yet have only a small actual volume of water to heat, so that it boils quickly, while the enlargement of the lower portion 3 presents a wider bottom area for quicker heating.

A further function of the reduced neck is to keep the bottle from tipping.

In the embodiment shown, an electric heating element 6 is secured within a suitable base 7, which base is permanently fastened, as by the beading 8, to the bottom head 5 of the container 1. Conventional electrical connections such as 9 are provided. To permit some circulation of air beneath the base and at the same time to prevent transmission of heat to any surface on which the utensil may stand, I provide feet, for example fiber disks 10 riveted to the base in an upright position and extending somewhat below the lower rim of the base. A handle, for example a hinged bail 11, is secured near the top of the neck 4.

When the utensil is used as a bottle sterilizer, the extension 2 is placed in the top of the neck 4. This extension is of a length somewhat less than the height of the bottle B, has a bottom opening 21 of suitable size to pass the bottle neck but stop the bottle shoulder, and the holder is itself slightly tapered inwardly as at 22. The top of this taper ends in a shoulder 23 above which there is a straight cylindrical portion 24 enlarged to about the diameter of the neck 4. The portion 24 is topped by a reduced neck 25 which only slightly clears the bottle.

Some steam from below passes between the bottle and the edge of the opening 21 and thus fills the extension 2 with steam, the enlargement 24 acting to some extent as a steam chamber and the contracted neck 25 reducing the escape of steam. The purpose of this is to keep the outside of the bottle hot so that steam going to the inside for sterilizing purposes will not be condensed and so cooled below sterilizing temperature.

The dimensions of the opening 21 are such as to engage the shoulder of a reduced mouthed bottle as shown, or the rim of an inverted wide mouthed bottle.

In order to sterilize the nipples I provide a jar J, ordinarily glass, having a neck 30 of appropriate size to fit readily within the upper portion 4 of the warmer. This jar J is shouldered out as shown at 31, Fig. 3, so as to rest on and close the top of the lower vessel 1 of the sterilizer. Incidentally it will also fit the top of the neck 25 of the extension 2.

The jar J has a cap 32 perforated as at 33 for admission of steam. In use, nipples for sterilization are placed in this jar J, the perforated cap 32 is applied and the jar inverted within the top of the warmer, as shown in Fig. 3.

For use for all purposes, water to the depth of about an inch, say about half the depth of the enlarged part of the bottom, is put into the warmer and the electricity is turned on, whereupon the heater 6 soon brings the water to whatever temperature is desired for warming or for sterilization as the case may be. Placing the bottle in position as in Fig. 1 will cause the water to rise well up in the neck 4. For sterilizing inverted empty bottles the water is of course allowed to boil to give off steam. For sterilizing a formula in a filled bottle the water would of course be allowed to heat only to the proper temperature. In case of a non-electric utensil, the base 7 and its various attached parts are omitted, and the vessel presents a broad heat-cooling surface to set on a gas flame or a stove or other heat source.

If a bottle is to be warmed the top 2 is omitted, and the utensil is used as in Fig. 1. If a bottle is to be sterilized the arrangement is as in Fig. 2. To sterilize nipples the arrangement is as in Fig. 3. After the nipples are sterilized the perforated cap 32 is replaced by a closed cap, as shown for example in my Patent No. 1,951,099, thus keeping the nipples in a closed sterile container until ready for use.

From the foregoing it will be seen that I have invented a nursery utensil characterized by compactness, simplicity and utility, and applicable to all the operations which are necessary in connection with infant feeding, namely sterilizing filled bottles, sterilizing empty bottles, and sterilizing nipples.

Other modes of applying the principle of my invention may be employed instead of the one explained, change being made as regards the structure herein disclosed, provided the means stated by the following claim or the equivalent of such stated means be employed.

I therefore particularly point out and distinctly claim as my invention:

In a nursery utensil as a subcombination, a sterilizer comprising a tube having a restricted bottom, a restricted top, and a steam retarding enlargement between said bottom and top, edges in said bottom defining an opening sized to pass the neck only of a nursing bottle.

LOUIS B. MEYERSON.